(12) United States Patent
Han

(10) Patent No.: US 12,685,938 B2
(45) Date of Patent: Jul. 21, 2026

(54) METHOD AND APPARATUS FOR IN-GAME INFORMATION INTERACTION, AND ELECTRONIC DEVICE

(71) Applicant: NETEASE (HANGZHOU) NETWORK CO., LTD., Hangzhou (CN)

(72) Inventor: Yichen Han, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 253 days.

(21) Appl. No.: 18/548,493

(22) PCT Filed: Apr. 22, 2022

(86) PCT No.: PCT/CN2022/088606
§ 371 (c)(1),
(2) Date: Aug. 30, 2023

(87) PCT Pub. No.: WO2022/267668
PCT Pub. Date: Dec. 29, 2022

(65) Prior Publication Data
US 2024/0131431 A1 Apr. 25, 2024
US 2024/0226740 A9 Jul. 11, 2024

(30) Foreign Application Priority Data
Jun. 25, 2021 (CN) .......................... 202110711528.X

(51) Int. Cl.
*A63F 13/537* (2014.01)
*A63F 13/533* (2014.01)
*A63F 13/57* (2014.01)
(52) U.S. Cl.
CPC .......... *A63F 13/537* (2014.09); *A63F 13/533* (2014.09); *A63F 13/57* (2014.09)

(58) Field of Classification Search
CPC .... A63F 13/537; A63F 13/53; A63F 13/5372; A63F 13/57; A63F 13/533
See application file for complete search history.

(56) References Cited

U.S. PATENT DOCUMENTS 5,393,074 A * 2/1995 Bear ...................... A63F 9/0291
472/66
5,590,062 A * 12/1996 Nagamitsu .............. G06F 3/011
715/848
(Continued)

FOREIGN PATENT DOCUMENTS

CN 107376357 A 11/2017
CN 108704316 A 10/2018
(Continued)

OTHER PUBLICATIONS

Luetin09, Perfect Dark Weaprospective, May 17, 2012, Youtube. com, pp. 1-9, at https://www.youtube.com/watch?v=0pGyjuEsx1k (last visited Nov. 4, 2025). (Year: 2012).*
(Continued)

*Primary Examiner* — Steve Rowland
(74) *Attorney, Agent, or Firm* — BCF LLP

(57) ABSTRACT

A method and an apparatus for in-game information interaction, and an electronic device are provided. The method includes: in response to determining that a first virtual object executes a first target interaction operation on a target object in a game scene, generating clue information corresponding to the first virtual object, and associating the clue information with the target object, where the target object is at least one of: a second virtual object, a non-player character and a virtual article; and in response to the second virtual object acquiring, from the target object, the clue information corresponding to the first virtual object, displaying identifier information corresponding to the first virtual object, based (Continued)

on the clue information, in a graphical user interface corresponding to the second virtual object.

18 Claims, 2 Drawing Sheets

(56) References Cited

U.S. PATENT DOCUMENTS

| | | | | |
|---|---|---|---|---|
| 5,769,718 | A * | 6/1998 | Rieder | A63F 13/52 463/31 |
| 6,030,289 | A * | 2/2000 | Nomi | G06T 15/50 463/31 |
| 6,413,163 | B1 * | 7/2002 | Yamauchi | A63F 13/10 463/31 |
| 6,612,930 | B2 * | 9/2003 | Kawagoe | A63F 13/5258 463/33 |
| 6,614,436 | B2 * | 9/2003 | Kawakami | A63F 13/843 345/474 |
| 7,115,031 | B2 * | 10/2006 | Miyamoto | A63F 13/26 463/31 |
| 7,594,847 | B1 * | 9/2009 | York | A63F 13/48 463/2 |
| 7,762,891 | B2 * | 7/2010 | Miyamoto | A63F 13/26 463/31 |
| 8,740,700 | B2 * | 6/2014 | Shikata | A63F 13/92 463/31 |
| 8,882,593 | B2 * | 11/2014 | Yamashita | A63F 13/52 463/31 |
| 2002/0054018 | A1 * | 5/2002 | Yamaguchi | A63F 13/5255 345/157 |
| 2004/0204212 | A1 * | 10/2004 | Sato | A63F 13/45 463/5 |
| 2004/0229687 | A1 * | 11/2004 | Miyamoto | A63F 13/843 463/30 |
| 2006/0135256 | A1 * | 6/2006 | Toyama | A63F 13/25 463/31 |
| 2010/0273544 | A1 | 10/2010 | Koganezawa et al. | |
| 2018/0256977 | A1 * | 9/2018 | Wakasono | A63F 13/54 |

FOREIGN PATENT DOCUMENTS

| | | | |
|---|---|---|---|
| CN | 110917621 | A | 3/2020 |
| CN | 112107857 | A | 12/2020 |
| CN | 112774196 | A | 5/2021 |
| CN | 113457133 | A | 10/2021 |
| CN | 113457156 | A | 10/2021 |

OTHER PUBLICATIONS

English translation of the International Search Report issued by the International Searching Authority of China on Jul. 19, 2022 in connection with International Application No. PCT/CN2022/088606, 2 pages.

English translation of the First Office Action issued by the China National Intellectual Property Administration in connection with China Patent Application No. CN 202110711528.X, 7 pages.

First Search issued by the China National Intellectual Property Administration in connection with China Patent Application No. CN 202110711528.X, 2 pages.

International Search Report issued by the International Searching Authority of China on Jul. 19, 2022 in connection with International Application No. PCT/CN2022/088606, 4 pages.

First Office Action issued by the China National Intellectual Property Administration in connection with China Patent Application No. CN 202110711528.X, 7 pages.

Notification of Grant issued by the China National Intellectual Property Administration in connection with China Patent Application No. CN 202110711528.X, 1 page.

Written Opinion issued by the International Searching Authority of China on Jul. 19, 2022 in connection with International Application No. PCT/CN2022/088606, 5 pages.

* cited by examiner

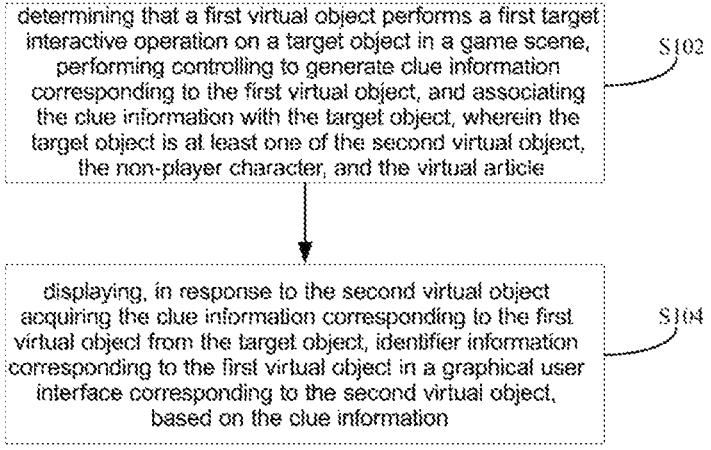

determining that a first virtual object performs a first target
interactive operation on a target object in a game scene,
performing controlling to generate clue information
corresponding to the first virtual object, and associating
the clue information with the target object, wherein the
target object is at least one of the second virtual object,
the non-player character, and the virtual article

S102 displaying, in response to the second virtual object
acquiring the clue information corresponding to the first
virtual object from the target object, identifier information
corresponding to the first virtual object in a graphical user
interface corresponding to the second virtual object,
based on the clue information

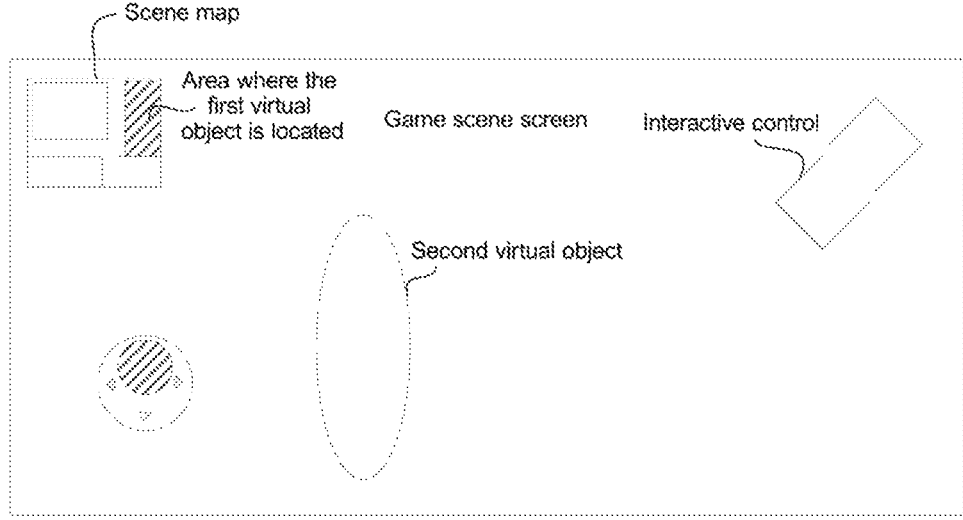

Scene map

Area where the
first virtual
object is located

Game scene screen          Interactive control

Second virtual object

FIG. 2

METHOD AND APPARATUS FOR IN-GAME INFORMATION INTERACTION, AND ELECTRONIC DEVICE

CROSS REFERENCE TO RELATED APPLICATIONS

The present disclosure is the U.S. National Stage Application of International Application No. PCT/CN2022/088606 filed on Apr. 22, 2022, which is based upon and claims the priority to a Chinese patent application No. 202110711528.X, filed on Jun. 25, 2021, and entitled "Method and Apparatus For In-Game Information Interaction, and Electronic Device", the entire contents of both of which are incorporated herein by reference for all purposes.

TECHNICAL FIELD

The present disclosure relates to the technical field of games, and in particular, to a method and apparatus for in-game information interaction, and electronic device.

BACKGROUND

In relevant stealth games, a plurality of players in the same match are divided into two major camps, i.e., a sneaking party and a chasing party. The sneaking party sneaks into a designated site to perform a task, and may need to disguise itself, acquire relevant task information, etc. in a process of performing the task; and the chasing party needs to identify, pursue and capture the sneaking party from the crowd to prevent the sneaking party from performing the task.

SUMMARY

In some embodiments, the present disclosure provides a method for in-game information interaction, including generating clue information corresponding to a first virtual object, in response to determining that the first virtual object performs a first target interactive operation on a target object in a game scene, and associating the clue information with the target object, where a game includes a game scene, the first virtual object having a first identity, at least one second virtual object having a second identity being opposite to the first identity, a non-player character, and a virtual article located in the game scene, where the first virtual object and the at least one second virtual object are located in a same match, and the target object is at least one of the at least one second virtual object, the non-player character, and the virtual article; and displaying, by a terminal, in response to one of the at least one second virtual object acquiring the clue information corresponding to the first virtual object from the target object, identifier information corresponding to the first virtual object in a graphical user interface corresponding to the one second virtual object, based on the clue information.

In some embodiments, the present disclosure provides an electronic device, including a processor and a memory, where the memory stores machine-executable instructions executable by the processor, and the processor is configured to execute the machine-executable instructions so as to implement a method for in-game information interaction, where method includes generating clue information corresponding to a first virtual object, in response to determining that the first virtual object performs a first target interactive operation on a target object in a game scene, and associating the clue information with the target object, where a game includes a game scene, the first virtual object having a first identity, at least one second virtual object having a second identity being opposite to the first identity, a non-player character, and a virtual article located in the game scene, where the first virtual object and the at least one second virtual object are located in a same match, and the target object is at least one of the at least one second virtual object, the non-player character, and the virtual article; and displaying in response to one of the at least one second virtual object acquiring the clue information corresponding to the first virtual object from the target object, identifier information corresponding to the first virtual object in a graphical user interface corresponding to the one second virtual object, based on the clue information.

In some embodiments, the present disclosure provides a non-volatile machine-readable storage medium, where the non-volatile machine-readable storage medium stores machine-executable instructions, and when the machine-executable instructions are called and executed by a processor, the machine-executable instructions cause the processor to implement a method for in-game information interaction, where the method includes generating clue information corresponding to a first virtual object, in response to determining that the first virtual object performs a first target interactive operation on a target object in a game scene, and associating the clue information with the target object, where a game includes a game scene, the first virtual object having a first identity, at least one second virtual object having a second identity being opposite to the first identity, a non-player character, and a virtual article located in the game scene, where the first virtual object and the at least one second virtual object are located in a same match, and the target object is at least one of the at least one second virtual object, the non-player character, and the virtual article; and displaying, by a terminal, in response to one of the at least one second virtual object acquiring the clue information corresponding to the first virtual object from the target object, identifier information corresponding to the first virtual object in a graphical user interface corresponding to the one second virtual object, based on the clue information.

BRIEF DESCRIPTION OF DRAWINGS

In order to more clearly illustrate embodiments of the present disclosure or technical solutions in the related art, drawings which need to be used in the description of the embodiments or the related art will be introduced briefly below. Apparently, the drawings in the description below are some embodiments of the present disclosure. A person skilled in the art still could obtain other drawings in light of these drawings, without using creative efforts.

FIG. 1 is a flowchart of a method for in-game information interaction provided in an embodiment of the present disclosure;

FIG. 2 is a schematic diagram of a graphical user interface of a second virtual object provided in an embodiment of the present disclosure;

DETAILED DESCRIPTION

Figure 3:
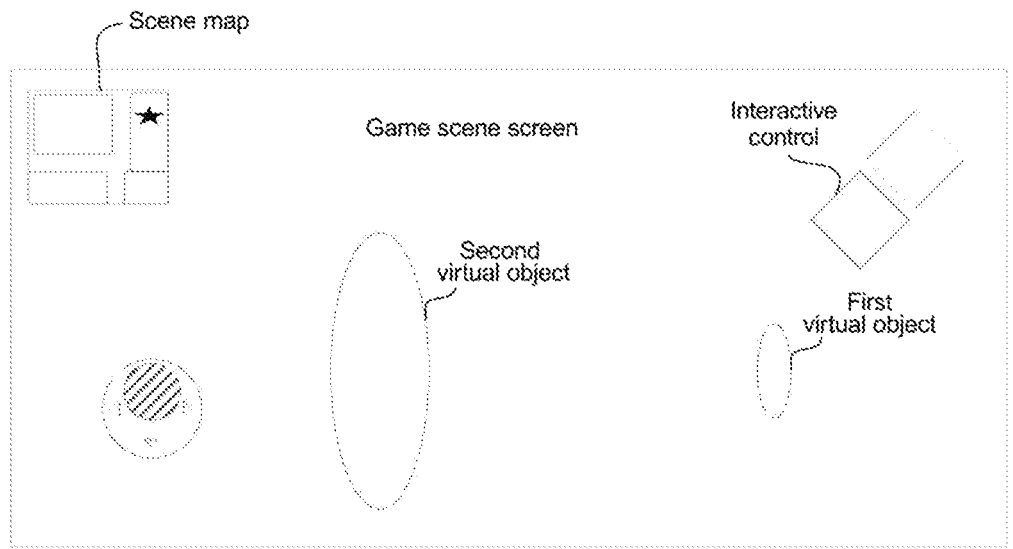
FIG. 3 is another schematic diagram of a graphical user interface of second virtual object provided in an embodiment of the present disclosure.

In order to make objectives, technical solutions, and advantages of embodiments of the present disclosure clearer, below the technical solutions in the present disclosure will be described clearly and completely in conjunction with drawings, and apparently, some but not all embodiments of the present disclosure are described. All of other embodiments, obtained by a person skilled in the art based on the embodiments of the present disclosure without using any creative efforts, shall fall with the scope of protection of the present disclosure.

Firstly, terms involved in the present disclosure are introduced.

Virtual Scene (Game Scene)

Virtual scene is a virtual scene that is displayed (or provided) when an application program runs on a terminal or a server. In some examples, the virtual scene is a simulation environment of real world, or a semi-simulated semi-fictional virtual environment, or a purely fictional virtual environment. The virtual scene is any one of a two-dimensional virtual scene, a 2.5-dimensional virtual scene, and a three-dimensional virtual scene, and the virtual environment may be sky, land, sea, and the like, where the land includes environmental elements such as desert, city, etc. In the above, the virtual scene is a scene of user(s) controlling virtual object(t) to complete game logic, for example, in a sandbox-type 3D shooting game, the virtual scene is a 3D game world for player(s) controlling virtual object(s) to fight, and an exemplary virtual scene may include at least one element of mountain, flat ground, river, lake, ocean, desert, sky, plant, building, and vehicle; for example, in a 2D or 2.5D card game, the virtual scene is a scene for displaying released card(s) or virtual object(s) corresponding to the card(s), and an exemplary virtual scene may include: arena, battlefield, or other "field" elements that may display a card battle state, or other elements; and for a 2D or 2.5D multi-player on-line tactical competitive game, the virtual scene is a 2D or 2.5D terrain scene for the virtual objects to battle, and an exemplary virtual scene may include: canyon style mountain, line, river, classroom, table and chair, platform and other elements.

(2) Game Interface

Game interface refers to an interface corresponding to an application program provided or displayed by a graphical user interface, and this interface includes a UI interface and a game screen (picture) for player(s) to interact. In some examples, the UI interface may include a game control (e.g., a skill control, a movement control, a function control, etc.), an indication identifier (e.g., a direction indication identifier, a character indication identifier, etc.), an information display area (e.g., the number of people killed, competition time, etc.), or a game setting control (e.g., system setting, shop, gold coin, etc.). In some examples, the game screen is a display screen corresponding to the virtual scene displayed by the terminal, and the game screen may include virtual objects performing a game logic in the virtual scene, such as a game character, an NPC character, and an AI character.

(3) Virtual Object

Virtual object refers to a dynamic object that may be controlled in the virtual scene. In some examples, the dynamic object may be a virtual character, a virtual animal, a cartoon character, etc. The virtual object is a character controlled by the player through an input device, or artificial intelligence (AI) set in virtual environment fight through training, or a non-player character (NPC) set in virtual scene fight. In some examples, the virtual object is a virtual character competing in the virtual scene. In some examples, the number of virtual objects in the virtual scene fight is preset, or dynamically determined according to the number of clients participating in the fight, which is not limited in the embodiments of the present disclosure. In some examples, the user may control the virtual object to move in the virtual scene, for example, control the virtual object to run, jump, crawl, etc., and also may control the virtual object to fight another virtual object using skills, virtual props, etc. provided by the application program.

(4) Player Character

Player character refers to a virtual object that may be manipulated by a player to conduct activities in a game environment, and may also be referred to as a hellspawn character or a hero character in some electronic games. The player character may be at least one of various forms such as virtual character, virtual animal, cartoon character, and virtual vehicle.

(5) Non-Player Character

Non-player character (NPC) refers to a virtual object that is not manipulated by a player, and the non-player character is generally controlled by the artificial intelligence of computer, and is character having its own behavior pattern. The non-player character generally may be classified into plot NPC, combat NPC, service NPC, etc., and sometimes an NPC may have multiple functions. The plot NPC and the service NPC usually do not belong to attackable objects, or belong to attackable objects but do not attack initiatively, but will fight back when being attacked by a player. Usually some NPCs may drop props, which may provide the players with some game information or trigger the plot.

In the related art, especially in an early stage of the match, it is very hard for the chasing party to discover the sneaking party by means of its own basic skills and visual abilities, which results in a slow progress of the match and procrastination of game rhythm, affecting the game experience of the players.

For ease of understanding, the game scene applicable to the present embodiment is described first. In a match game, a plurality of virtual objects participate, and each user is corresponding to one virtual object; the plurality of virtual objects may be divided into two groups, one group being first virtual object(s) and the other group being second virtual object(s), the number of virtual objects in each group may be one or more, and the number of virtual objects in the two groups may be same or different. The first virtual objects have a first identity, the second virtual objects have a second identity, and the first identity and the second identity are opposite. In addition to the first virtual objects and the second virtual objects, the game scene further includes non-player character(s) and virtual article(s).

In the stealth games, the first virtual objects also may be referred to as attacking party or sneaking party, and the second virtual objects also may be referred to as defending party or chasing party. After a match game is started, the first virtual objects need to sneak into a designated site to perform a task, and need to disguise itself and hide in the process of performing the task, so as to mingle in the non-player characters and not to be discovered by the second virtual objects, thus completing the task by means of various virtual articles. In the process of the first virtual objects performing the task, the second virtual objects need to discover the first virtual objects from many non-player characters in the scene and chase them, so as to prevent the first virtual objects from performing the task. After the identity of the first virtual objects is discovered by the second virtual objects, the first virtual objects may escape with the help of terrain, props, and the like, so as to re-enter a disguised state. In the whole match, the first virtual objects and the second virtual objects circularly conduct disguising and hiding, searching and investigating, and chasing and escaping.

In the early stage of the game match, it is very hard for the chasing party to discover the sneaking party by means of its own basic skills and visual abilities, which results in a slow progress of the match and procrastination of game rhythm, and affects the game experience of the players. The present embodiment provides a method and an apparatus for in-game information interaction, and an electronic device, so as to promote the process of the match between both attacking and defending parties, increase the progress speed of the game match, and speed up the game rhythm, thus improving the game experience of the players.

The method for in-game information interaction in an embodiment of the present disclosure may run on a terminal or a server. In the above, the terminal may be a local terminal. When the method for in-game information interaction runs on a server, this method may be realized and executed based on a cloud interaction system, where the cloud interaction system includes the server and a client.

In some examples, the cloud interaction system may run various cloud applications, for example, a cloud game. Taking the cloud game as an example, the cloud game refers to a cloud computation-based game mode. In a running mode of the cloud game, a running main body of a game program and a main body for presenting the game screen are separated; the storage and running of the method for in-game information interaction are completed on a cloud game server, a client functions to receive and transmit data and present the game screen, for example, the client may be a display device with a data transmission function, close to a user side, e.g., a mobile terminal, a television, a computer, a handheld computer, etc.; however, the terminal that performs information processing is the cloud game server in the cloud. When playing the game, the player operates the client to send operation instructions to the cloud game server, the cloud game server runs the game according to the operation instruction, encodes and compresses data such as the game screen, and returns the same to the client via network, and finally, the game screen is decoded and output through the client.

In some examples, the terminal may be a local terminal. Taking a game as an example, the local terminal stores a game program and is configured to present a game screen. The local terminal is configured to interact with a player via a graphical user interface, i.e., conventionally downloading and installing the game program and running the same through an electronic device. The local terminal may provide the graphical user interface to the player in various manners, for example, the graphical user interface may be rendered and displayed on a display screen of the terminal, or may be provided to the player by means of holographical projection. For example, the local terminal may include a display screen and a processor, where the display screen is configured to present the graphical user interface, the graphical user interface includes the game screen, and the processor is configured to run the game, generate the graphical user interface, and control the display of the graphical user interface on the display screen.

In a possible embodiment, an example of the present disclosure provides a method for in-game information interaction, and the graphical user interface is provided by a terminal, where the terminal may be the local terminal mentioned in the preceding, and also may be the client in the cloud interaction system mentioned in the preceding. The graphical user interface is provided by this terminal, where the graphical user interface includes a scene screen (picture) of at least a part of game scene. The game includes the game scene, and the first virtual object having a first identity, the second virtual object having a second identity, the non-player character, and the virtual article located in the game scene, where the first virtual object and the second virtual object are located in the same match, and the second identity is an identity opposite to the first identity.

In the game match, if the first virtual object, i.e., the attacking party, wants to win, it needs to complete many processes within a limited period of time, for example, before performing a task, or in a process of performing the task, it needs to subdue a virtual object, change a disguise, hide the subdued virtual object, etc.; and when performing the task, it needs to activate specific virtual setting to acquire related password information, transmit the acquired password information, and obtain final intelligence using the password information, etc. When the first virtual object completes the task, the first virtual object wins in this case; and when the first virtual object does not complete the task, if all the first virtual objects are discovered by the second virtual objects and successfully attacked, the second virtual objects win.

In the above game match, the present embodiment introduces a clue system, and some specific operations of the first virtual object in the match may leave clue information, and after discovering the clue information, the second virtual object may quickly identify or look for the first virtual object using the clue information, thus accelerating the progress of the game match and speeding up the game rhythm.

Based on the above objectives, the present embodiment first provides a method for in-game information interaction, where the game includes a game scene, and the first virtual object having a first identity, the second virtual object having a second identity, the non-player character, and the virtual article located in the game scene, where the first virtual object and the second virtual object are located in the same match, and the second identity is an identity opposite to the first identity. As shown in FIG. 1, the method includes the following steps:

Step S102, determining that the first virtual object performs a first target interactive operation on the target object in the game scene, performing controlling to generate clue information corresponding to the first virtual object, and associating the clue information with the target object, where the target object is at least one of the second virtual object, the non-player character, and the virtual article.

When the target object is different, the first target interactive operation performed generally is also different. For example, when the target object is the second virtual object or the non-player character, the first target interactive operation performed by the first virtual object may be an attack operation on the second virtual object or the non-player character, and after being attacked, the second virtual object or the non-player character may be set to enter a death state or a syncope state. As the first virtual object causes attack on the target object, the clue information corresponding to the first virtual object may be made to be associated with the target object; the clue information corresponding to the first virtual object may be ID information about the first virtual object, character identifier information, position information about the first virtual object, or other relevant information that helps to discover the first virtual object as soon as possible. Associating the clue information with the target object may be construed as leaving the clue information about the first virtual object on an object model of the target object, that is, the second virtual object, when discovering the object model of this target object or reaching a position near this target object, may acquire the clue information corresponding to the first virtual object.

When the target object is the virtual article, and when the first virtual object performs activation, information acquiring or a relevant operation on the virtual article, the clue information corresponding to the first virtual object may be made to be associated with this virtual article; and the second virtual object, when discovering the virtual article or reaching a position near this virtual article, may acquire the clue information corresponding to the first virtual object.

Step S104, displaying, in response to the second virtual object acquiring the clue information corresponding to the first virtual object from the target object, identifier information corresponding to the first virtual object in a graphical user interface corresponding to the second virtual object, based on the clue information.

In order to discover the first virtual object as soon as possible, the second virtual object usually moves and searches around in the game scene, and when discovering a target object in the death state or the syncope state, may rescue the target object, and acquire the clue information corresponding to the first virtual object from the target object; or when discovering the virtual article in an activated state (start-up state), also may perform a closing operation on the virtual article, and further acquire the clue information corresponding to the first virtual object from the virtual article.

After acquiring the clue information, the second virtual object may trigger it to display the identifier information corresponding to the first virtual object, where the identifier information may be identity information and position information about the first virtual object; and the player controlling the second virtual object may discover the first virtual object as soon as possible based on the identifier information, so as to chase the first virtual object to prevent the first virtual object from performing the task. The identifier information specifically may be displayed in a scene map in the graphical user interface, and also may be displayed on the object model of the first virtual object in the game scene or at a position near the object model of the first virtual object.

In the above method for in-game information interaction, when the first virtual object performs the first target interactive operation on the target object in the game scene, controlling is performed to generate the clue information corresponding to the first virtual object, and the clue information is made to be associated with the target object; and when the second virtual object acquires the clue information corresponding to the first virtual object from the target object, the identifier information corresponding to the first virtual object is displayed in the graphical user interface corresponding to the second virtual object, based on the clue information. In this method, when the first virtual object performs a relevant operation on the target object, the clue information about the first virtual object is made to be associated with the target object, the second virtual object may obtain the clue information about the first virtual object when discovering the target object, and the clue information may help the second virtual object to identify and find the first virtual object as soon as possible. This method may promote the process of the match between both attacking and defending parties, increase the progress speed of the game match, and speed up the game rhythm, thus improving the game experience of the players.

In a specific game scene, the first virtual object moves in the game scene in a manner of hiding identity, so as to complete a preset game task; and the second virtual object identifies the first virtual object in the game scene based on the identifier information corresponding to the first virtual object, so as to prevent the first virtual object from completing the game task.

At the beginning of the match, the first virtual object enters a specific location area or a virtual building, and the first virtual object wears its own clothes. The first virtual object may search for a clothes package in the game scene, and realize disguise by putting on clothes in the clothes package; the first virtual object also may subdue a specific non-player character, and the first virtual character puts on the clothes of the non-player character, thus realizing disguise. Of course, in the process of subduing the non-player character, the clue information corresponding to the first virtual object will be made to be associated with the non-player character. In addition, the first virtual object also may perform a hiding operation on the subdued non-player character, for example, dragging the non-player character into a cabinet, so as to reduce the probability of the subdued non-player character being discovered by the second virtual object. By means of the various disguise above, the first virtual object may hide identity and complete the preset game task.

The second virtual object usually has certain basic skills and visual abilities, but by means of these, it may be very hard to discover which one of the virtual objects (including the non-player characters) moving in the game scene is the first virtual object, while in the present embodiment, the second virtual object may obtain the identifier information about the first virtual object through the clue information, thus the second virtual object is assisted in quickly identifying and finding the first virtual object so as to prevent the first virtual object from completing the task, thus improving the tension and intensity of the match between both the attacking and defending parties.

For ease of understanding of the present embodiment, a related process of performing the task by the first virtual object is described herein.

The first virtual object, i.e., the attacking party, has a task target of cracking a key intelligence, and then completing evacuation. The first virtual object may crack the key intelligence by inputting multi-digit password information in any one of a plurality of virtual articles (which specifically may be virtual password facility) set in the game scene. At the beginning of the game match, the password information is unknown; the first virtual object needs to reach a specific area in the game scene, crack a specific virtual article (which specifically may be a virtual dynamic safety device) to acquire a dynamic password, and submit the dynamic password at the preceding virtual password facility, so as to unlock one digit of password information, and obtain the multi-digit password information in the same way, further cracking the key intelligence.

In the process of acquiring the dynamic password by the first virtual object, an initial state of the virtual dynamic safety device is a closed state, the first virtual object approaches the virtual dynamic safety device, and activates the virtual dynamic safety device through an interactive operation, and after the virtual dynamic safety device is activated, the system notifies all virtual objects in the game match that this virtual dynamic safety device has been activated. The cracking progress of the activated virtual dynamic safety device is gradually increased over time. At the time of activation, the cracking progress of the virtual dynamic safety device is 0%, then the cracking progress is continuously increased, and when reaching 100%, the cracking is completed, the state of the virtual dynamic safety device is converted to stolen, and the first virtual object obtains one digit of dynamic password.

The process of continuously increasing the cracking progress of the virtual dynamic safety device is the task information acquisition process mentioned below in the present embodiment.

In the process of cracking the virtual dynamic safety device, the first virtual object activating the virtual dynamic safety device needs to be located in a designated area near the virtual dynamic safety device, and if the first virtual object leaves this designated area, the cracking speed is decreased to 0, and the cracking progress remains unchanged. In practical, this designated area may be divided into a plurality of sub-areas according to the distance to the virtual dynamic safety device, where when the first virtual object is located in a sub-area close to the virtual dynamic safety device, the cracking speed is relatively high, and when the first virtual object is located in a sub-area far away from the virtual dynamic safety device, the cracking progress is relatively slow. With the continuous change of the location of the first virtual object, the cracking speed is also changed continuously. This method may assist the first virtual object in quickly obtaining the dynamic password, but increase the risk of exposing the identity of the first virtual object.

If the first virtual object that activates the virtual dynamic safety device needs to leave the designated area above, other first virtual objects may enter this designated area, so as to ensure that the cracking progress is continuously increased.

In the process of cracking the virtual dynamic safety device, the second virtual object, i.e., the defending party, if discovering the virtual dynamic safety device that has been activated, may approach the virtual dynamic safety device, and close the virtual dynamic safety device by performing a related interactive operation. After the virtual dynamic safety device is closed, the cracking progress is stopped. In practical, the cracking progress may be divided into a plurality of sections (intervals), and the cracking progress is rolled back to a start point of the section where the cracking progress is located, when the virtual dynamic safety device is closed. For example, the cracking progress is divided into three progress sections of 0-33%, 34-66%, and 67-100% in total, and when the virtual dynamic safety device is closed and the cracking progress is 50%, in this case, the cracking progress is rolled back and stopped at 34%.

In the process of cracking the virtual dynamic safety device, the non-player character also may approach the virtual dynamic safety device, and the non-player character may block the cracking progress by performing an operation on the virtual dynamic safety device and decrease the cracking speed to zero. The first virtual object may perform an attack operation on the non-player character to thereby break the blockage of the cracking progress. In this way, no non-player character will approach the virtual dynamic safety device for a future period of time (e.g., 20 seconds). In addition, if the cracking progress is blocked and the second virtual object closes the virtual dynamic safety device, in this case, the non-player character also will leave the virtual dynamic safety device, and the blockage of the cracking progress is immediately broken.

In order to give a higher sense of risk and tension to the game players, with the change of the cracking progress, cracking difficulty of the virtual dynamic safety device may be increased. For example, when the cracking progress reaches a certain progress threshold, the frequency of the non-player character approaching the virtual dynamic safety device may be increased; or when the cracking progress reaches a certain progress threshold, other first virtual objects may replace the current first virtual object to be located in the foregoing designated area; or when the cracking progress reaches a certain progress threshold, the first virtual object needs to perform continuous interactive operations on the virtual dynamic safety device, so that it may be ensured that the cracking progress is continuously increased.

After the virtual dynamic safety device has been cracked, the first virtual object obtains the dynamic password, the first virtual object carries this dynamic password to approach the forgoing virtual password facility, and submits the dynamic password to the virtual password facility, so that one digit of password information may be unlocked. All the first virtual objects share the password information, and after all the password information is unlocked, the first virtual objects may crack the key information, and the first virtual objects win the current game match.

However, if the first virtual object, when carrying the dynamic password, is identified and attacked successfully by the second virtual object, the dynamic password carried by the first virtual object is automatically destroyed. The state of the corresponding virtual dynamic safety device is changed from stolen to closed, and the cracking progress of this virtual dynamic safety device is restored to 0%.

The following states may be set for the foregoing virtual dynamic safety device in the game match: in the activated state, when the first virtual object is located in a designated area and no non-player character blocks the cracking progress, the virtual dynamic safety device is in an activated good-signal state; in the activated state, when the first virtual object is located outside the designated area and no non-player character blocks the cracking progress, the virtual dynamic safety device is in an activated bad-signal state; in the activated state, when the non-player character appears and blocks the cracking progress, the virtual dynamic safety device is in an activated blocked state; when the virtual dynamic safety device is in the closed state, if the cracking progress of this virtual dynamic safety device does not reach 100%, the virtual dynamic safety device is in a normal closed state; and if the cracking progress of the virtual dynamic safety device reaches 100%, the virtual dynamic safety device is in the stolen state.

After the virtual dynamic safety device is activated, the virtual dynamic safety device may be closed by the second virtual object, or the first virtual object leaves the designated area, or the cracking progress reaches 100%, thus ending the activation of the virtual dynamic safety device. After the first virtual object activates the virtual dynamic safety device, the state of the virtual dynamic safety device is the activated good-signal state, when the first virtual object is located in the designated area, the virtual dynamic safety device is cracked at a preset speed, and when the first virtual object leaves the designated area, the cracking speed of the virtual dynamic safety device is zero. The cracking speed may prompt the first virtual object with a particular icon, for example, a Wi-Fi signal icon, but without the need of prompting the second virtual object.

After leaving the designated area, when the first virtual object returns to the designated area again, the cracking speed is restored from zero to a preset speed. After the cracking progress reaches 100%, the state of the virtual dynamic safety device is changed to stolen, the first virtual object obtains the dynamic password, and meanwhile the system provides the second virtual object with the clue information about the first virtual object.

After the first virtual object leaves the designated area, the state of the virtual dynamic safety device is the activated bad-signal state; and after another first virtual object enters the designated area, the state of the virtual dynamic safety device is converted into the activated good-signal state. In this case, the clue information associated with the virtual dynamic safety device is updated to the clue information about the first virtual object currently located in the designated area.

When the non-player character approaches and operates this virtual dynamic safety device, the state of this virtual dynamic safety device is converted into an activated blocked state; and after the first virtual object performs an attack operation on the non-player character and attacks successfully, the blocked state is lifted, and the state of this virtual dynamic safety device is converted into the activated good-signal state or the activated bad-signal state.

When this virtual dynamic safety device is in the activated good-signal state, the activated bad-signal state, or the activated blocked state, the second virtual object(s) each may close the virtual dynamic safety device. After the virtual dynamic safety device is closed, the second virtual object may obtain clue information about the first virtual object that activates this virtual dynamic safety device. If the non-player character is blocking the virtual dynamic safety device, the non-player character ends the blocking operation at the instant the second virtual object closes the virtual dynamic safety device.

In addition, a plurality of first virtual objects may cooperate with one another so as to obtain the dynamic password. For example, one first virtual object activates the virtual dynamic safety device, and another first virtual object attacks the non-player character, to prevent the non-player character from blocking the virtual dynamic safety device. If the first virtual object is attacked by the second virtual object, other first virtual object(s) may release a skill to rescue the attacked first virtual object. If the first virtual object that activates the virtual dynamic safety device is discovered by the second virtual object and escapes, another first virtual object enters the designated area to ensure that the cracking progress is continuously increased. This method may improve activation efficiency and activation success rate of the dynamic password and survival rate of the first virtual object at the cost of reducing the overall action rate of the first virtual objects.

Various possible associating manners of the clue information about the first virtual object are specifically described below.

In a first associating mode, when the target object is the second virtual object or the non-player character, it is determined that the first virtual object performs an attack operation on the target object, and the target object enters a designated state; and controlling is performed to generate the clue information corresponding to the first virtual object, and the clue information is made to be associated with the target object.

In some examples, the first virtual object may perform the attack operation on the non-player character, so as to subdue the non-player character, and the first virtual object may obtain clothes of the non-player character so as to disguise itself. After being discovered by the second virtual object, the first virtual object may fight with the second virtual object, and in this case, the first virtual object performs an attack operation on the second virtual object. After the first virtual object successfully attacks the target object, the target object enters a designated state, for example, a death state, a syncope state, or a restricted activity state. In this case, the clue information corresponding to the first virtual object is generated, and the clue information is made to be associated with the target object.

In practical, the player may trigger an attack control displayed on the graphical user interface so as to control the first virtual object to perform the attack operation. For example, for the non-player character, when the first virtual object is located within a specified distance range of the non-player character, for example, within three meters, and a first connecting line between a virtual camera and the first virtual object in the game scene and a second connecting line between the virtual camera and the non-player character form an included angle smaller than a preset angle, for example, 45 degrees, the attack control is displayed; and the player may trigger the attack control to perform the attack operation on the non-player character.

The above clue information helps the second virtual object to quickly identify and find the first virtual object. Considering the fairness of game, the present embodiment further provides a self-protection mechanism for the first virtual object. In some examples, it is determined that the first virtual object performs a destruction operation on the target object; and the object model of the target object is controlled to be deleted in the game scene, and the clue information associated with the target object is deleted.

As the target object on which the first virtual object performs the attack operation is associated with the clue information, the first virtual object may perform the destruction operation on the target object, where the destruction operation specifically may include hiding the target object, transferring the target object to a place where the target object cannot be discovered by any object, or completely destroying the object model of the target object using a specific prop; in this case, the object model of the target object is no longer present in the game scene, and the clue information associated with the target object also disappears therewith. This method provides a coping strategy of the clue information for the first virtual object, which contributes to reducing the number of pieces of clue information about the first virtual object, but the first virtual object needs to perform the destruction operation, which needs certain time cost and meanwhile increases the risk of being exposed.

In another mode of associating the clue information about the first virtual object, when the target object is the virtual article, it is determined that the first virtual object starts the task information acquisition process for the virtual article; and controlling is performed to generate the clue information corresponding to the first virtual object, and the clue information is made to be associated with the virtual article.

For example, in order to complete a task, the first virtual object needs to activate a specific virtual article, so as to obtain password information, and then obtain a key intelligence according to the password information, so as to complete the task. The virtual article may be virtual facility, virtual instrument, and the like. After reaching a position where the virtual article is located, the first virtual object may perform an interactive operation on the virtual article, to activate the virtual article, so that the virtual article starts to run the task information acquisition process. The task information acquisition process usually needs a certain time to be completed. As the first virtual object performs the interactive operation on the virtual article, the clue information corresponding to the first virtual object is generated, and the clue information is made to be associated with the virtual article.

After the task information acquisition process is activated, if the process is smoothly completed, the first virtual object may obtain corresponding password information, in this case, it is determined that the task information acquisition process is completed; the clue information associated with the virtual article is deleted; and the clue information is provided to the second virtual object. As the first virtual object has obtained the password information, in order to accelerate the process of game match, it is unnecessary for the second virtual object to discover the clue information from the virtual article, and the clue information is directly provided to the second virtual object. After the virtual article starts the task information acquisition process, if the second virtual object discovers the process before the process is completed and stops the process, in this case, the second virtual object may obtain the clue information associated with the virtual article.

A specific embodiment for acquiring the clue information by the second virtual object continues to be described below. In practical, it is determined that the second virtual object performs a second target interactive operation on the target object, to acquire the clue information associated with the target object; and identifier information corresponding to the first virtual object is displayed based on the clue information, in the graphical user interface corresponding to the second virtual object. When the target object is different, the above second target interactive operation generally is also different generally. When moving in the game scene, if the second virtual object discovers the target object in a designated state, for example, a death state or a syncope state, it may obtain the clue information about the first virtual object, where this first virtual object has performed the first target interactive operation on this target object in advance.

In some examples, when the target object is the second virtual object or the non-player character, it is determined that the second virtual object performs a rescue operation on the target object, and the target object restores from the designated state to a normal state, where the designated state includes: a state of the target object after being attacked by the first virtual object in advance; and the clue information associated with the target object is acquired. When the second virtual object reaches the vicinity of the target object, the user may perform the above rescue operation by triggering a rescue control on the graphical user interface, and then the second virtual object may obtain the clue information associated with the target object. It should be noted that the game scene generally includes a plurality of second virtual objects. When the target object is a second virtual object, the second virtual object may no longer move in the game scene or trigger relevant operation, in this case, it is necessary to perform the above rescue operation by other second virtual objects except the target object and obtain relevant clue information.

When the target object is a virtual article, it is determined that the second virtual object performs a process closing operation on the virtual article; and the clue information associated with the designated target is acquired. When the second virtual object reaches a position near the virtual article and the virtual article has started the task information acquisition process, the process may be closed by a process closing control, and after the process is closed, the task information acquisition process is stopped.

Before the task information acquisition process is completed, if the second virtual object has no time to close this process, the first virtual object acquires the task information, in this case, it is determined that the task information acquisition process for the virtual article is completed; and the clue information associated with the virtual article is provided to the second virtual object.

The second virtual object may obtain the clue information corresponding to the first virtual object in many manners in the above, and then the identifier information corresponding to the first virtual object is displayed in the graphical user interface corresponding to the second virtual object, based on the clue information. The identifier information corresponding to the first virtual object may include various kinds of information such as an area where the first virtual object is located, a position where the first virtual object is located, a position passed by the first virtual object, and ID of the first virtual object. The identifier information corresponding to the first virtual object may be displayed in a variety of manners as follows.

First, the area where the first virtual object is located, indicated by the clue information, may be displayed in a first display format, in a scene map of the game scene in the graphical user interface corresponding to the second virtual object. For example, the scene may be divided into a plurality of sub-areas in advance, and after acquiring the clue information about the first virtual object, the second virtual object acquires a sub-area where the first virtual object is currently located, and this sub-area is highlighted in the scene map. The first display format above may include highlight display, flashing display, display with a specific color, etc. The area where the above first virtual object is located may have a larger range or a smaller range, and specifically may be set based on game requirements. FIG. 2 shows the graphical user interface of the second virtual object. In the scene map, the shaded area is the area where the first virtual object is located. In this manner, the second virtual object may be assisted in narrowing a search range for the first virtual object, so that the second virtual object may find the first virtual object as soon as possible, thus promoting the progress of the game match.

In another manner of displaying the identifier information corresponding to the first virtual object, in the scene map of the game scene in the graphical user interface corresponding to the second virtual object, the area where the first virtual object is located, indicated by the clue information, is displayed in a second display format; the second display format may include a highlight point, a flashing point, an arrow, or the like, so as to indicate a precise position of the first virtual object. It is also possible that in the game scene in the graphical user interface corresponding to the second virtual object, the object model of the first virtual object indicated by the clue information is displayed in a third display format. The third display format may include highlight display, flashing display, etc. at the edge of the object model of the first virtual object, thus increasing the risk of exposing the first virtual object. As shown in FIG. 3, the position where the first virtual object is located is displayed in two manners at the same time, where in the scene map, the first virtual object is indicated by an identifier shaped in a five-pointed star; and meanwhile in the game scene, the edge of the object model of the first virtual object is displayed by emitting light, and when in the vicinity of the first virtual object, the second virtual object may quickly identify the first virtual object.

In practical, it is possible that while the position where the first virtual object is located, indicated by the clue information, is displayed in the second display format, in the scene map of the game scene in the graphical user interface corresponding to the second virtual object, the object model of the first virtual object indicated by the clue information is displayed in the third display format in the game scene in the graphical user interface corresponding to the second virtual object; it is also possible that the position where the first virtual object is located, indicated by the clue information, is displayed in the second display format in the scene map of the game scene in the graphical user interface corresponding to the second virtual object, or the object model of the first virtual object indicated by the clue information is displayed in the third display format in the game scene in the graphical user interface corresponding to the second virtual object.

The above manner may further improve the probability of the first virtual object being identified and found by the second virtual object, thereby further accelerating the process of the game, and increasing the tension of game participation.

In a third manner of displaying the identifier information corresponding to the first virtual object, a subsequent display manner after the clue information is acquired may be determined according to a current display manner of the identifier information. In some examples, a current display format of the identifier information corresponding to the first virtual object is determined; a target display format of displaying the identifier information corresponding to the first virtual object in the graphical user interface corresponding to the second virtual object is determined according to the current display format, and the area where the first virtual object is located, indicated by the clue information, is displayed in the target display format.

As an example, in an initial state, the second virtual object has not yet acquired any clue information about the first virtual object, in this case, any identifier information corresponding to the first virtual object is not displayed in the graphical user interface of the second virtual object. After the second virtual object acquires the clue information about the first virtual object, in this case, the current display format of the identifier information corresponding to the first virtual object is that the identifier information corresponding to the first virtual object is not displayed, and in this current display format, the target display format of the identifier information corresponding to the first virtual object is determined after the second virtual object acquires the clue information about the first virtual object; for example, the target display format may be that the area where the first virtual object is located, indicated by the clue information, is displayed in the first display format in the above scene map of the game scene in the graphical user interface corresponding to the second virtual object.

If the current display format is that the area where the first virtual object is located, indicated by the clue information, is displayed in the first display format in the scene map of the game scene in the graphical user interface corresponding to the second virtual object, in this case, the second virtual object acquires the clue information about the first virtual object again, and in this current display format, the target display format of the identifier information corresponding to the first virtual object is determined after the second virtual object acquires the clue information about the first virtual object again; for example, this target display format may be that: the position where the first virtual object is located, indicated by the clue information, is displayed in the second display format in the scene map of the game scene in the graphical user interface corresponding to the second virtual object; or the target display format may be that the object model of the first virtual object indicated by the clue information is displayed in the third display format, in the game scene in the graphical user interface corresponding to the second virtual object; alternatively, this target display format further may be that the area where the first virtual object is located is further displayed, in a way of being zoomed out, on the basis of the area where the first virtual object is located displayed in the current display format.

In the above manner, according to the current display format of the identifier information, the target display format of the identifier information is determined after confirming the acquisition of clue information, the identifier information is gradually changed, by continuously acquiring the clue information, so as to provide accurate position information of the first virtual object to the second virtual object. This enhances the sense of tension and rhythm in game participation and improves the user experience.

In a fourth manner of displaying the identifier information corresponding to the first virtual object, the manner of displaying the identifier information corresponding to the first virtual object may be changed according to the game process. In some examples, it is determined that the second virtual object acquires first clue information corresponding to the first virtual object for the first time, and in the scene map of the game scene in the graphical user interface corresponding to the second virtual object, the area where the first virtual object is located, indicated by the clue information, is displayed in the first display format, with the displaying lasting for a first time period; within the first time period after acquiring first clue information, it is determined that the second virtual object acquires second clue information corresponding to the first virtual object for a second time, and in the scene map of the game scene in the graphical user interface corresponding to the second virtual object, the position where the first virtual object is located, indicated by the clue information, is displayed in the second display format; and/or, in the game scene in the graphical user interface corresponding to the second virtual object, the object model of the first virtual object indicated by the clue information is displayed in the third display format, with the displaying lasting for a second time period.

By the same reasoning, when the second virtual object acquires the second clue information corresponding to the first virtual object for the second time, it is possible that at the same time the position where the first virtual object is located, indicated by the clue information, is displayed in the second display format, in the scene map of the game scene in the graphical user interface corresponding to the second virtual object; and the object model of the first virtual object indicated by the clue information is displayed in the third display format, in the game scene in the graphical user interface corresponding to the second virtual object, it is also possible that the position where the first virtual object is located, indicated by the clue information, is displayed in the second display format in the scene map of the game scene in the graphical user interface corresponding to the second virtual object, or the object model of the first virtual object indicated by the clue information is displayed in the third display format in the game scene in the graphical user interface corresponding to the second virtual object.

As an example, when the second virtual object obtains the clue information about the first virtual object for the first time, the area where the first virtual object is located, indicated by the clue information, is displayed in the first display format in the scene map of the game scene in the graphical user interface corresponding to the second virtual object, with the displaying of the area where the first virtual object is located lasting for 20 seconds; within the 20 seconds, if the second virtual object obtains the clue information about the first virtual object for the second time, the preceding area where the first virtual object is located may not be displayed any more, instead, in the scene map of the game scene in the graphical user interface corresponding to the second virtual object, the position where the first virtual object is located, indicated by the clue information, is displayed in the second display format, with the displaying of the position where the first virtual object is located lasting for 10 seconds.

Further, within the second time period after the second clue information is acquired, it is determined that the second virtual object acquires third clue information corresponding to the first virtual object again, and the second time period is prolonged. For example, if the clue information about the first virtual object is discovered again within the 10 seconds of displaying the position where the first virtual object is located, when display duration of the position where the first virtual object is located reaches 10 seconds, the display duration may be further increased by 10 seconds, thus increasing the time period of exposing the position of the first virtual object, assisting the second virtual object in quickly finding the first virtual object, and speeding up the game process.

It should be noted that, for the foregoing "it is determined that the second virtual object acquires the clue information corresponding to the first virtual object for the first time", "for the first time" here means acquiring the clue information about the first virtual object for the first time when the identifier information corresponding to the first virtual object is not displayed in any form, rather than acquiring the clue information about the first virtual object for the first time by the second virtual object in the current game match. For example, a time period may be preset for the display of the identifier information, the second virtual object acquires the clue information corresponding to the first virtual object, and after the identifier information is displayed in the above first display format or second display format for this time period, the identifier information is no longer displayed. After the identifier information is not displayed, the second virtual object acquires the clue information corresponding to the first virtual object, in this case, although the second virtual object has acquired the clue information corresponding to the first virtual object before, it is still considered that the second virtual object acquires the first clue information corresponding to the first virtual object for the first time.

It should also be noted that, in the game match, a plurality of second virtual objects are included, all the second virtual objects together collect the clue information about the first virtual objects in the game scene, and the clue information is shared among respective second virtual objects. It is assumed that a second virtual object B acquires clue information about a first virtual object A, and then in the scene map of the game scene in the graphical user interface corresponding to the second virtual object, the area where the first virtual object is located, indicated by the clue information, is displayed in the first display format. In the process of displaying the area, a second virtual object B acquires the clue information about the first virtual object A again, in this case, it is understood that the second virtual object acquires the clue information about the first virtual object A for the second time, then in the scene map of the game scene in the graphical user interface corresponding to the second virtual object, the position where the first virtual object is located, indicated by the clue information, is displayed in the second display format, or in the game scene in the graphical user interface corresponding to the second virtual object, the object model of the first virtual object indicated by the clue information is displayed in the third display format. There are also a plurality of first virtual objects in the game match, and the clue information acquired by the second virtual object A and the second virtual object B in the above is corresponding to the same first virtual object.

A fifth manner of displaying the identifier information corresponding to the first virtual object may be implemented by combining the foregoing third and fourth display manners. That is, when the target display format of the identifier information is determined after the clue information about the first virtual object is acquired, both the current display format of the identifier information corresponding to the first virtual object and the game process need to be considered simultaneously.

In some examples, in an initial state, the second virtual object has not yet acquired any clue information about the first virtual object, in this case, the identifier information corresponding to the first virtual object is not displayed in any form. After the second virtual object acquires the clue information about the first virtual object for the first time, in this case, the current display format of the identifier information is that the identifier information corresponding to the first virtual object is not displayed, and at this time, the second virtual object acquires the clue information about the first virtual object for the first time, based on which, the target display format of the identifier information is that: the area where the first virtual object is located, indicated by the clue information, in the first display format, in the scene map of the game scene in the graphical user interface corresponding to the second virtual object, with the displaying lasting for the first time period.

Within the first time period after the first clue information is acquired, it is determined that the second virtual object acquires the second clue information corresponding to the first virtual object for a second time, in this case, the current display format of the identifier information is that the area where the first virtual object is located, indicated by the clue information, is displayed in the first display format, and at this time, the clue information about the first virtual object is acquired for the second time, based on which, the target display format of the identifier information is that: the position where the first virtual object is located, indicated by the clue information, is displayed in the second display format, in the scene map of the game scene in the graphical user interface corresponding to the second virtual object; and/or the object model of the first virtual object indicated by the clue information is displayed in the third display format, in the game scene in the graphical user interface corresponding to the second virtual object, with the displaying lasting for the second time period.

In other examples, in response to the first virtual object moving in the game scene, a movement track of the first virtual object is displayed in the game scene based on a preset display density. For the movement track of the first virtual object, in some examples, related identifier may be displayed on a path that the first virtual object passes by, to prompt the second virtual object that the first virtual object has passed by the position where the identifier is located, so as to help the second virtual object to look for the first virtual object in a nearby area or along a specific direction.

In order to improve the degree of fidelity of the game scene, the movement track of the first virtual object may be displayed by virtual footprints. In some examples, in response to the movement of the first virtual object in the game scene, a moving path of the first virtual object is acquired; and the virtual footprints left by the virtual object in the moving process is displayed every preset length of the path on the moving path. For example, for every ten meters of movement of the first virtual object in the moving process, one virtual footprint is generated and displayed in the game scene, and this virtual footprint may disappear after a designated period of time, for example, the virtual footprint disappears after five seconds of display. The virtual footprint not only may be used to indicate that the first virtual object has passed by this position, but also may be used to indicate a moving direction of the first virtual object. This manner may assist the second virtual object in tracking the movement of the first virtual object, and quickly finding the first virtual object.

In another examples, considering that the second virtual object may acquire the clue information about the first virtual object multiple times, a clue accumulated value of the first virtual object may be set, and the clue accumulated value corresponding to the first virtual object is updated according to the clue information, where the clue information includes a clue value; and the corresponding display manner of the identifier information is determined according to a threshold range reached by the clue accumulated value.

Every time the clue information about the first virtual object is acquired, the clue in the clue information is accumulated to the clue accumulated value. The above clue accumulated value may be embodied in a form of numerical value, a threshold range of corresponding clue accumulated value is set for each display manner of the identifier information, and when the clue accumulated value reaches a certain threshold range, the identifier information is displayed according to the corresponding display manner.

In practical, a first threshold range reached by the clue accumulated value is determined, and in the scene map of the game scene in the graphical user interface corresponding to the second virtual object, the area where the first virtual object is located, indicated by the clue information, is displayed in the first display format, with the displaying lasting for the first time period; within the first time period in which the area where the first virtual object is located, indicated by the clue information, is displayed in the first display format, a second threshold range reached by the clue accumulated value is determined, and in the scene map of the game scene in the graphical user interface corresponding to the second virtual object, the position where the first virtual object is located, indicated by the clue information, is displayed in the second display format; and/or, in the game scene in the graphical user interface corresponding to the second virtual object, the object model of the first virtual object indicated by the clue information is displayed in the third display format, with the displaying lasting for the second time period.

In the above mode, updating the display format of the identifier information about the first virtual object by means of the clue accumulated value facilitates the second virtual object in speeding up the game rhythm, and the accumulated value increases as quickly as possible so as to obtain precise position information about the first virtual object, thus improving the rhythm and tension of the game.

In the above mode, in the processes of associating the clue information about the first virtual object with the target object and the second virtual object acquiring the clue information, neither an additional operation required to be performed by a player is introduced, nor the player needs to pay additional understanding cost or memory cost, and these processes may be completely integrated into relevant interactive operations of the stealth games.

Figure 4:
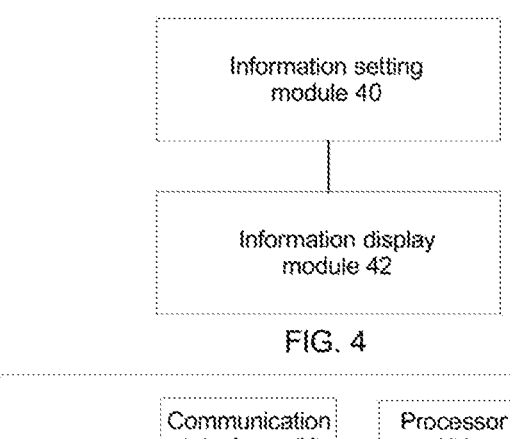
FIG. 4 is a structural schematic diagram of an apparatus for in-game information interaction provided in an embodiment of the present disclosure.

Corresponding to the above method embodiment, referring to a structural schematic diagram of an apparatus for in-game information interaction shown in FIG. 4, the game includes a game scene, and a first virtual object having a first identity, a second virtual object having a second identity, a non-player character, and a virtual article located in the game scene, where the first virtual object and the second virtual object are located in the same match, and the second identity is an identity opposite to the first identity, and the apparatus includes:

an information setting module 40, configured to determine that the first virtual object performs a first target interactive operation on a target object in the game scene, perform controlling to generate clue information corresponding to the first virtual object, and associate the clue information with the target object, where the target object is at least one of the second virtual object, the non-player character, and the virtual article; and an information display module 42, configured to display, in response to the second virtual object acquiring the clue information corresponding to the first virtual object from the target object, identifier information corresponding to the first virtual object in a graphical user interface corresponding to the second virtual object, based on the clue information.

In the above apparatus for in-game information interaction, when the first virtual object performs the first target interactive operation on the target object in the game scene, controlling is performed to generate the clue information corresponding to the first virtual object, and the clue information is made to be associated with the target object; and when the second virtual object acquires the clue information corresponding to the first virtual object from the target object, the identifier information corresponding to the first virtual object is displayed in the graphical user interface corresponding to the second virtual object, based on the clue information. In this mode, when the first virtual object performs a relevant operation on the target object, the clue information about the first virtual object is made to be associated with the target object, the second virtual object may obtain the clue information about the first virtual object when discovering the target object, and the clue information may help the second virtual object to identify and find the first virtual object as soon as possible. This mode may promote the process of the match between both attacking and defending parties, increase the progress speed of the game match, and speed up the game rhythm, thus improving the game experience of the players.

The above first virtual object moves in the game scene in a manner of hiding identity, so as to complete a preset game task; and the second virtual object identifies the first virtual object in the game scene, based on the identifier information corresponding to the first virtual object, so as to prevent the first virtual object from completing the game task.

The above target object includes the second virtual object or the non-player character; and the above information setting module is further configured to: determine that the first virtual object performs an attack operation on the target object and the target object enters a designated state; and perform controlling to generate the clue information corresponding to the first virtual object, and associate the clue information with the target object.

The above apparatus further includes an information deletion module, configured to: determine that the first virtual object performs a destruction operation on the target object; and control the object model of the target object to be deleted in the game scene, and delete the clue information associated with the target object.

The above target object includes the virtual article; and the above information setting module is further configured to: determine that the first virtual object starts a task information acquisition process for the virtual article; and perform controlling to generate the clue information corresponding to the first virtual object, and associate the clue information with the virtual object.

The above information display module is further configured to: determine that the second virtual object performs a second target interactive operation on the target object, and acquire the clue information associated with the target object; and display identifier information corresponding to the first virtual object in the graphical user interface corresponding to the second virtual object based on the clue information.

The above target object includes the second virtual object or the non-player character; the game scene includes a plurality of second virtual objects; and the above information display module is further configured to: determine that the second virtual object performs a rescue operation on the target object, and the target object restores from the designated state to a normal state, where the designated state includes: a state of the target object after being attacked by the first virtual object in advance; and acquire the clue information associated with the target object.

The above target object includes the virtual article; and the above information display module is further configured to: determine that the second virtual object performs a process closing operation on the virtual article; and acquire the clue information associated with the designated target.

The above apparatus further includes: an information providing module, configured to: determine that the task information acquisition process for the virtual article is completed; and provide the clue information associated with the virtual article to the second virtual object.

The above information display module is further configured to: display, in a scene map of the game scene in the graphical user interface corresponding to the second virtual object, an area where the first virtual object is located, indicated by the clue information, in a first display format.

The above information display module is further configured to: display, in the scene map of the game scene in the graphical user interface corresponding to the second virtual object, the position where the first virtual object is located, indicated by the clue information, in a second display format; and/or display, in the game scene in the graphical user interface corresponding to the second virtual object, the object model of the first virtual object indicated by the clue information in a third display format.

The above information display module is further configured to: determine a current display format of the identifier information corresponding to the first virtual object; determine, according to the current display format, a target display format of displaying the identifier information corresponding to the first virtual object in the graphical user interface corresponding to the second virtual object, and display the area where the first virtual object is located, indicated by the clue information, in the target display format.

The above information display module is further configured to: determine that the second virtual object acquires first clue information corresponding to the first virtual object for the first time, and display, in the scene map of the game scene in the graphical user interface corresponding to the second virtual object, the area where the first virtual object is located, indicated by the clue information, in the first display format, with the displaying lasting for a first time period; determine, within the first time period after acquiring the first clue information, that the second virtual object acquires second clue information corresponding to the first virtual object for a second time, and display, in the scene map of the game scene in the graphical user interface corresponding to the second virtual object, the position where the first virtual object is located, indicated by the clue information, in the second display format; and/or, display, in the game scene in the graphical user interface corresponding to the second virtual object, the object model of the first virtual object indicated by the clue information in the third display format, with the displaying lasting for a second time period.

The above apparatus further includes: a delay module, configured to: determine, within the second time period after the second clue information is acquired, that the second virtual object acquires third clue information corresponding to the first virtual object again, and prolong the second time period.

The above apparatus further includes: a track display module, configured to: display, in response to the first virtual object moving in the game scene, a movement track of the first virtual object in the game scene based on a preset display density.

The above track display module is further configured to: acquire, in response to the first virtual object moving in the game scene, a moving path of the first virtual object; and display virtual footprint(s) left by the virtual object in a moving process every preset length of the path on the moving path.

The above information display module is further configured to: update a clue accumulated value corresponding to the first virtual object according to the clue information, where the clue information includes a clue value; and determine corresponding display manner of the identifier information according to a threshold range reached by the clue accumulated value.

The present embodiment further provides an electronic device, including a processor and a memory, where the memory stores machine-executable instructions that may be executed by the processor, and the processor executes the machine-executable instructions so as to implement the above method for in-game information interaction. The electronic device may be a server or a terminal.

Figure 5:
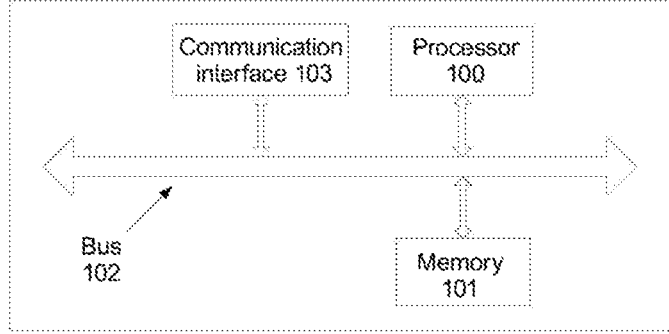
FIG. 5 is a schematic diagram of an electronic device provided in an embodiment of the present disclosure.

Referring to FIG. 5, the electronic device includes a processor 100 and a memory 101, where the memory 101 stores machine-executable instructions that may be executed by the processor 100, and the processor 100 executes the machine-executable instructions so as to implement the above method for in-game information interaction. The method for information interaction includes: determining that the first virtual object performs a first target interactive operation on a target object in a game scene, performing controlling to generate clue information corresponding to the first virtual object, and associating the clue information with the target object, where the target object is at least one of the second virtual object, the non-player character, and the virtual article; displaying, in response to second virtual object acquiring the clue information corresponding to the first virtual object from the target object, identifier information corresponding to the first virtual object in a graphical user interface corresponding to the second virtual object, based on the clue information.

The above first virtual object moves in the game scene in a manner of hiding identity, so as to complete a preset game task; and the second virtual object identifies the first virtual object in the game scene based on the identifier information corresponding to the first virtual object, so as to prevent the first virtual object from completing the game task.

The above target object includes the second virtual object or the non-player character; and the above step of "determining that the first virtual object performs a first target interactive operation on a target object in a game scene, performing controlling to generate clue information corresponding to the first virtual object, and associating the clue information with the target object" includes: determining that the first virtual object performs an attack operation on the target object, and the target object enters a designated state; and performing controlling to generate the clue information corresponding to the first virtual object, and associating the clue information with the target object.

After the above step of "performing controlling to generate clue information corresponding to the first virtual object, and associating the clue information with the target object", the method further includes: determining that the first virtual object performs a destruction operation on the target object; and controlling the object model of the target object to be deleted in the game scene, and deleting the clue information associated with the target object The above target object includes the virtual article; and the above step of "determining that the first virtual object performs a first target interactive operation on a target object in a game scene, performing controlling to generate clue information corresponding to the first virtual object, and associating the clue information with the target object" includes: determining that the first virtual object starts a task information acquisition process for the virtual article; and performing controlling to generate the clue information corresponding to the first virtual object, and associating the clue information with the virtual article.

The above step of "displaying, in response to the second virtual object acquiring the clue information corresponding to the first virtual object from the target object, identifier information corresponding to the first virtual object in a graphical user interface corresponding to the second virtual object, based on the clue information" includes: determining that the second virtual object performs a second target interactive operation on the target object, and acquiring the clue information associated with the target object; and displaying, based on the clue information, identifier information corresponding to the first virtual object in the graphical user interface corresponding to the second virtual object.

The above target object includes the second virtual object or the non-player character; the game scene includes a plurality of second virtual objects; and the above step of "determining that the second virtual object performs a second target interactive operation on the target object, and acquiring the clue information associated with the target object" includes: determining that the second virtual object performs a rescue operation on the target object and the target object restores from a designated state to a normal state, where the designated state includes: a state of the target object after being attacked by the first virtual object in advance; and acquiring the clue information associated with the target object.

The above target object includes the virtual article; and the above step of "determining that the second virtual object performs a second target interactive operation on the target object, and acquiring the clue information associated with the target object" includes: determining that the second virtual object performs a process closing operation on the virtual article; and acquiring the clue information associated with the designated target.

Before the above step of determining that the second virtual object performs a process closing operation on the virtual article, the method further includes: determining that the task information acquisition process for the virtual article is completed; and providing the clue information associated with the virtual article to the second virtual object.

The above step of displaying identifier information corresponding to the first virtual object in the graphical user interface corresponding to the second virtual object based on the clue information includes: displaying, in a scene map of the game scene in the graphical user interface corresponding to the second virtual object, an area where the first virtual object is located, indicated by the clue information, in a first display format.

The above step of displaying identifier information corresponding to the first virtual object in the graphical user interface corresponding to the second virtual object based on the clue information includes: displaying, in the scene map of the game scene in the graphical user interface corresponding to the second virtual object, the position where the first virtual object is located, indicated by the clue information, in a second display format; and/or displaying, in the game scene in the graphical user interface corresponding to the second virtual object, the object model of the first virtual object indicated by the clue information in a third display format.

The above step of displaying identifier information corresponding to the first virtual object in the graphical user interface corresponding to the second virtual object based on the clue information includes: determining a current display format of the identifier information corresponding to the first virtual object; determining, according to the current display format, a target display format of displaying the identifier information corresponding to the first virtual object in the graphical user interface corresponding to the second virtual object, and displaying the area where the first virtual object is located, indicated by the clue information, in the target display format.

The above step of displaying identifier information corresponding to the first virtual object in the graphical user interface corresponding to the second virtual object based on the clue information includes: determining that the second virtual object acquires first clue information corresponding to the first virtual object for the first time, and displaying, in the scene map of the game scene in the graphical user interface corresponding to the second virtual object, the area where the first virtual object is located, indicated by the clue information, in the first display format, with the displaying lasting for a first time period; determining, within the first time period after acquiring the first clue information, that the second virtual object acquires second clue information corresponding to the first virtual object for a second time, and displaying, in the scene map of the game scene in the graphical user interface corresponding to the second virtual object, the position where the first virtual object is located, indicated by the clue information, in the second display format; and/or, displaying, in the game scene in the graphical user interface corresponding to the second virtual object, the object model of the first virtual object indicated by the clue information in the third display format, with the displaying lasting for a second time period.

The above method further includes: determining, within the second time period after the second clue information is acquired, that the second virtual object acquires third clue information corresponding to the first virtual object again, and prolonging the second time period.

The above method further includes: displaying, in response to the first virtual object moving in the game scene, a movement track of the first virtual object in the game scene based on a preset display density.

The above step of "displaying, in response to the first virtual object moving in the game scene, a movement track of the first virtual object in the game scene based on a preset display density" includes: acquiring, in response to the first virtual object moving in the game scene, a moving path of the first virtual object; and displaying a virtual footprint left by the virtual object in a moving process every preset length of the path on the moving path.

The above step of "displaying, in response to the second virtual object acquiring the clue information corresponding to the first virtual object from the target object, identifier information corresponding to the first virtual object in a graphical user interface corresponding to the second virtual object, based on the clue information" includes: updating a clue accumulated value corresponding to the first virtual object according to the clue information, where the clue information includes a clue value; and determining the corresponding display manner of the identifier information according to a threshold range reached by the clue accumulated value.

With the above electronic device, when the first virtual object performs the first target interactive operation on the target object in the game scene, controlling is performed to generate the clue information corresponding to the first virtual object, and the clue information is made to be associated with the target object; and when the second virtual object acquires the clue information corresponding to the first virtual object from the target object, the identifier information corresponding to the first virtual object is displayed in the graphical user interface corresponding to the second virtual object, based on the clue information. In this mode, when the first virtual object performs a relevant operation on the target object, the clue information about the first virtual object is made to be associated with the target object, the second virtual object may obtain the clue information about the first virtual object when discovering the target object, and the clue information may help the second virtual object to identify and find the first virtual object as soon as possible. This mode may promote the process of the match between both attacking and defending parties, increase the progress speed of the game match, and speed up the game rhythm, thus improving the game experience of the players.

Further, the electronic device shown in FIG. 5 further includes a bus 102 and a communication interface 103, and the processor 100, the communication interface 103, and the memory 101 are connected via the bus 102.

In the above, the memory 101 may include high-speed random access memory (RAM), and also may include non-volatile memory, for example, at least one disk memory. Communication between this system network element and at least one other network element is achieved through at least one communication interface 103 (possibly wired or wireless), and Internet, Wide Area Network, local network, Metropolitan Area Network and so on may be used. The bus 102 may be an ISA bus, a PCI bus, an EISA bus, or the like. The bus may be an address bus, a data bus, a control bus and so on. For ease of representation, the bus is represented merely with one two-way arrow in FIG. 5, but it does not mean that there is only one bus or one type of bus.

The processor 100 may be an integrated circuit chip, with a signal processing function. In an implementation process, various steps of the above method may be completed by an integrated logic circuit of hardware or instruction in a software form in the processor 100. The above processor 100 may be a general-purpose processor, including central processing unit (CPU for short), network processor (NP for short), etc.; also may be a digital signal processor (DSP for short), an application specific integrated circuit (ASIC for short), a field-programmable gate array (FPGA for short) or other programmable logic devices, discrete gates, transistor logic devices, or discrete hardware components. Various methods, steps, and logical block diagrams disclosed in the embodiments of the present disclosure may be implemented or executed. A general purpose processor may be a microprocessor, or the processor may be any conventional processor or the like. The steps in the method disclosed in the embodiments of the present disclosure may be directly carried out and completed by hardware decoding processor, or carried out and completed by combination of hardware and software modules in the decoding processor. The software module may be located in a mature storage medium in the art such as a random access memory, a flash memory, a read-only memory, a programmable read-only memory or an electrically erasable programmable memory, and register. The storage medium is located in the memory 101, and the processor 100 reads information in the memory 101, and is combined with hardware thereof to complete the steps of the method of the preceding embodiments.

The present embodiment further provides a machine-readable storage medium, the machine-readable storage medium stores machine-executable instructions, and when the machine-executable instructions are called and executed by a processor, the machine-executable instructions cause the processor to implement the above method for in-game information interaction, where the method for information interaction includes: determining that the first virtual object performs a first target interactive operation on a target object in a game scene, performing controlling to generate clue information corresponding to the first virtual object, and associating the clue information with the target object, where the target object is at least one of the second virtual object, the non-player character, and the virtual article; displaying, in response to the second virtual object acquiring the clue information corresponding to the first virtual object from the target object, identifier information corresponding to the first virtual object in a graphical user interface corresponding to the second virtual object, based on the clue information.

The above first virtual object moves in the game scene in a manner of hiding identity, so as to complete a preset game task; and the second virtual object identifies the first virtual object in the game scene based on the identifier information corresponding to the first virtual object, so as to prevent the first virtual object from completing the game task.

The above target object includes the second virtual object or the non-player character; and the above step of "determining that the first virtual object performs a first target interactive operation on a target object in a game scene, performing controlling to generate clue information corresponding to the first virtual object, and associating the clue information with the target object" includes: determining that the first virtual object performs an attack operation on the target object, and the target object enters a designated state; and performing controlling to generate the clue information corresponding to the first virtual object, and associating the clue information with the target object.

After the above step of "performing controlling to generate clue information corresponding to the first virtual object, and associating the clue information with the target object", the method further includes: determining that the first virtual object performs a destruction operation on the target object; and controlling the object model of the target object to be deleted in the game scene, and deleting the clue information associated with the target object.

The above target object includes the virtual article; and the above step of "determining that the first virtual object performs a first target interactive operation on a target object in a game scene, performing controlling to generate clue information corresponding to the first virtual object, and associating the clue information with the target object" includes: determining that the first virtual object starts a task information acquisition process for the virtual article; and performing controlling to generate the clue information corresponding to the first virtual object, and associating the clue information with the virtual article.

The above step of "displaying, in response to the second virtual object acquiring the clue information corresponding to the first virtual object from the target object, identifier information corresponding to the first virtual object in a graphical user interface corresponding to the second virtual object based on the clue information" includes: determining that the second virtual object performs a second target interactive operation on the target object, and acquiring the clue information associated with the target object; and displaying, based on the clue information, identifier information corresponding to the first virtual object in the graphical user interface corresponding to the second virtual object.

The above target object includes the second virtual object or the non-player character; the game scene includes a plurality of second virtual objects; and the above step of "determining that the second virtual object performs a second target interactive operation on the target object, and acquiring the clue information associated with the target object" includes: determining that the second virtual object performs a rescue operation on the target object, and the target object restores from a designated state to a normal state, where the designated state includes: a state of the target object after being attacked by the first virtual object in advance; and acquiring the clue information associated with the target object.

The above target object includes the virtual article; and the above step of "determining that the second virtual object performs a second target interactive operation on the target object, and acquiring the clue information associated with the target object" includes: determining that the second virtual object performs a process closing operation on the virtual article; and acquiring the clue information associated with the designated target.

Before the above step of determining that the second virtual object performs a process closing operation on the virtual article, the method further includes: determining that the task information acquisition process for the virtual article is completed; and providing the clue information associated with the virtual article to the second virtual object.

The above step of displaying identifier information corresponding to the first virtual object in the graphical user interface corresponding to the second virtual object based on the clue information includes: displaying, in a scene map of the game scene in the graphical user interface corresponding to the second virtual object, an area where the first virtual object is located, indicated by the clue information, in a first display format.

The above step of displaying identifier information corresponding to the first virtual object in the graphical user interface corresponding to the second virtual object based on the clue information includes: displaying, in the scene map of the game scene in the graphical user interface corresponding to the second virtual object, the position where the first virtual object is located, indicated by the clue information, in a second display format; and/or displaying, in the game scene in the graphical user interface corresponding to the second virtual object, the object model of the first virtual object indicated by the clue information in a third display format.

The above step of displaying identifier information corresponding to the first virtual object in the graphical user interface corresponding to the second virtual object based on the clue information includes: determining a current display format of the identifier information corresponding to the first virtual object; determining, according to the current display format, a target display format of displaying the identifier information corresponding to the first virtual object in the graphical user interface corresponding to the second virtual object, and displaying the area where the first virtual object is located, indicated by the clue information, in the target display format.

The above step of displaying identifier information corresponding to the first virtual object in the graphical user interface corresponding to the second virtual object based on the clue information includes: determining that the second virtual object acquires first clue information corresponding to the first virtual object for the first time, and displaying, in the scene map of the game scene in the graphical user interface corresponding to the second virtual object, the area where the first virtual object is located, indicated by the clue information, in the first display format, with the displaying lasting for a first time period; determining, within the first time period after acquiring first clue information, that the second virtual object acquires second clue information corresponding to the first virtual object for a second time, and displaying, in the scene map of the game scene in the graphical user interface corresponding to the second virtual object, the position where the first virtual object is located, indicated by the clue information, in the second display format; and/or, displaying, in the game scene in the graphical user interface corresponding to the second virtual object, the object model of the first virtual object indicated by the clue information in the third display format, with the displaying lasting for a second time period.

The above method further includes: determining, within the second time period after the second clue information is acquired, that the second virtual object acquires third clue information corresponding to the first virtual object again, and prolonging the second time period.

The above method further includes: displaying, in response to the first virtual object moving in the game scene, a movement track of the first virtual object in the game scene based on a preset display density.

The above step of "displaying, in response to the first virtual object moving in the game scene, a movement track of the first virtual object in the game scene based on a preset display density" includes: acquiring, in response to the first virtual object moving in the game scene, a moving path of the first virtual object; and displaying a virtual footprint left by the virtual object in a moving process every preset length of the path on the moving path.

The above step of "displaying, in response to the second virtual object acquiring the clue information corresponding to the first virtual object from the target object, identifier information corresponding to the first virtual object in a graphical user interface corresponding to the second virtual object, based on the clue information" includes: updating a clue accumulated value corresponding to the first virtual object according to the clue information, where the clue information includes a clue value; and determining the corresponding display manner of the identifier information according to a threshold range reached by the clue accumulated value.

With the above machine-readable storage medium, when the first virtual object performs the first target interactive operation on the target object in the game scene, controlling is performed to generate the clue information corresponding to the first virtual object, and the clue information is made to be associated with the target object; and when the second virtual object acquires the clue information corresponding to the first virtual object from the target object, the identifier information corresponding to the first virtual object is displayed in the graphical user interface corresponding to the second virtual object, based on the clue information. In this mode, when the first virtual object performs a relevant operation on the target object, the clue information about the first virtual object is made to be associated with the target object, the second virtual object may obtain the clue information about the first virtual object when discovering the target object, and the clue information may help the second virtual object to identify and find the first virtual object as soon as possible. This mode may promote the process of the match between both attacking and defending parties, increase the progress speed of the game match, and speed up the game rhythm, thus improving the game experience of the players.

A computer program product of the method and apparatus for in-game information interaction, the electronic device, and the storage medium provided in the embodiments of the present disclosure includes a computer-readable storage medium storing program codes, and instructions included in the program codes may be used to execute the methods described in the foregoing method embodiments, which will not be described herein again.

A person skilled in the art could clearly know that for the sake of convenience and conciseness of description, reference may be made to corresponding processes in the preceding method embodiments for specific operation processes of the system and device described above, which will not be described herein again.

In addition, in the description of the embodiments of the present disclosure, unless otherwise specified and defined explicitly, terms "mount", "join", and "connect" should be construed in a broad sense, for example, a connection may be a fixed connection, a detachable connection, or an integrated connection; it may be a mechanical connection, also may be an electrical connection; it may be a direct connection, an indirect connection through an intermediate medium, or an internal communication between two elements. For a person skilled in the art, specific meanings of the above terms in the present disclosure could be understood according to specific circumstances.

If the function is realized in a form of software functional unit and is sold or used as an independent product, it may be stored in one computer readable storage medium. Based on such understanding, the technical solution of the present disclosure essentially or the part making contribution to the related art or part of this technical solution may be embodied in a form of software product, and this computer software product is stored in one storage medium, including several instructions used to make one computer device (which may be a personal computer, a sever or a network device etc.) execute all or some of the steps of the methods of various embodiments of the present disclosure. The aforementioned storage medium includes various media in which program codes may be stored, such as U disk, mobile hard disk, read-only memory (ROM), random access memory (RAM), magnetic disk or optical disk.

In the description of the present disclosure, it should be noted that orientation or positional relationships indicated by terms such as "center", "upper", "lower", "left", "right", "vertical", "horizontal", "inner", and "outer" are based on orientation or positional relationships as shown in the accompanying drawings, merely for facilitating the description of the present disclosure and simplifying the description, rather than indicating or implying that related devices or elements have to be in the specific orientation, or configured and operated in a specific orientation, therefore, they should not be construed as limitation on the present disclosure. Besides, terms "first", "second", and "third" are merely for descriptive purpose, but should not be construed as indicating or implying importance in the relativity.

Finally, it should be noted that the above embodiments are merely specific embodiments of the present disclosure, for illustrating the technical solutions of the present disclosure, rather than limiting the present disclosure, and the scope of protection of the present disclosure should not be limited thereto. While the detailed description is made to the present disclosure with reference to the preceding embodiments, those ordinarily skilled in the art should understand that within the technical scope disclosed in the present disclosure, any skilled person familiar with the present technical field still could make modifications or readily conceive changes for the technical solutions described in the preceding embodiments, or make equivalent substitutions to some of the technical features therein; these modifications, changes, or substitutions do not make the essence of the corresponding technical solutions depart from the spirit and scope of the technical solutions of the embodiments of the present disclosure, and they all should be covered within the scope of protection of the present disclosure. Therefore, the protection scope of the present disclosure should be based on the scope of protection of the claims.

What is claimed is:

1. A method for in-game information interaction, comprising:
generating clue information corresponding to a first virtual object, in response to determining that the first virtual object performs a first target interactive operation on a target object in a same game scene, and associating the clue information with the target object, wherein a game comprises the same game scene, the first virtual object having a first identity, at least one second virtual object having a second identity being opposite to the first identity, a non-player character, and a virtual article located in the same game scene, wherein the first virtual object and the at least one second virtual object are located in a same match, and the target object is at least one of the at least one second virtual object, the non-player character, and the virtual article; and
displaying, by a terminal, in response to one of the at least one second virtual object acquiring the clue information corresponding to the first virtual object from the target object, identifier information corresponding to the first virtual object in a graphical user interface corresponding to the one second virtual object, based on the clue information;

wherein the displaying in response to one of the at least one second virtual object acquiring the clue information corresponding to the first virtual object from the target object identifier information corresponding to the first virtual object in a graphical user interface corresponding to the second virtual object based on the clue information comprises:

acquiring the clue information associated with the target object, in response to determining that the second virtual object performs a second target interactive operation on the target object; and displaying, based on the clue information, the identifier information corresponding to the first virtual object in the graphical user interface corresponding to the second virtual object;

wherein the displaying based on the clue information the identifier information corresponding to the first virtual object in the graphical user interface corresponding to the second virtual object comprises:

determining a current display format of the identifier information corresponding to the first virtual object; and determining, according to the current display format, a target display format of displaying the identifier information corresponding to the first virtual object in the graphical user interface corresponding to the second virtual object, and displaying an area where the first virtual object is located, indicated by the clue information, in the target display format.

2. The method according to claim 1, wherein the first virtual object moves in the game scene in a manner of hiding identity, and completes a preset game task; and the second virtual object prevents the first virtual object from completing the game task, by identifying the first virtual object in the game scene based on the identifier information corresponding to the first virtual object.

3. The method according to claim 1, wherein the target object comprises the second virtual object or the non-player character; and the generating clue information corresponding to a first virtual object in response to determining that the first virtual object performs a first target interactive operation on a target object in the game scene and associating the clue information with the target object comprises:

determining that the first virtual object performs an attack operation on the target object and the target object enters a designated state; and generating the clue information corresponding to the first virtual object, and associating the clue information with the target object.

4. The method according to claim 3, further comprising:

determining that the first virtual object performs a destruction operation on the target object; and controlling an object model of the target object to be deleted in the game scene, and deleting the clue information associated with the target object.

5. The method according to claim 1, wherein the target object comprises the virtual article; and the generating clue information corresponding to a first virtual object in response to determining that the first virtual object performs a first target interactive operation on a target object in the game scene and associating the clue information with the target object comprises:

determining that the first virtual object starts a task information acquisition process for the virtual article; and generating the clue information corresponding to the first virtual object, and associating the clue information with the virtual article.

6. The method according to claim 1, wherein the target object comprises the second virtual object or the non-player character; and the game scene comprises a plurality of second virtual objects; and the acquiring the clue information associated with the target object in response to determining that the second virtual object performs a second target interactive operation on the target object comprises:

determining that the second virtual object performs a rescue operation on the target object and the target object restores from a designated state to a normal state, wherein the designated state comprises: a state of the target object after being attacked by the first virtual object in advance; and acquiring the clue information associated with the target object.

7. The method according to claim 1, wherein the target object comprises the virtual article; and the acquiring the clue information associated with the target object in response to determining that the second virtual object performs a second target interactive operation on the target object comprises:

determining that the second virtual object performs a process closing operation on the virtual article; and acquiring the clue information associated with a designated target.

8. The method according to claim 7, further comprising:

determining that a task information acquisition process for the virtual article is completed; and providing the clue information associated with the virtual article to the second virtual object.

9. The method according to claim 1, wherein the displaying based on the clue information the identifier information corresponding to the first virtual object in the graphical user interface corresponding to the second virtual object comprises:

displaying, in a scene map of the game scene in the graphical user interface corresponding to the second virtual object, an area where the first virtual object is located, indicated by the clue information, in a first display format.

10. The method according to claim 1, wherein the displaying based on the clue information the identifier information corresponding to the first virtual object in the graphical user interface corresponding to the second virtual object comprises:

displaying, in a scene map of the game scene in the graphical user interface corresponding to the second virtual object, a position where the first virtual object is located, indicated by the clue information, in a second display format; or displaying, in the game scene in the graphical user interface corresponding to the second virtual object, an object model of the first virtual object indicated by the clue information in a third display format.

11. The method according to claim 1, wherein the displaying based on the clue information the identifier information corresponding to the first virtual object in the graphical user interface corresponding to the second virtual object comprises:

determining that the second virtual object acquires first clue information corresponding to the first virtual object for the first time, and displaying, in a scene map of the game scene in the graphical user interface corresponding to the second virtual object, an area where the first virtual object is located, indicated by the clue information, in the first display format, with the displaying lasting for a first time period; and determining, within the first time period after the first clue information is acquired, that the second virtual object acquires second clue information corresponding to the first virtual object for a second time, and displaying, in the scene map of the game scene in the graphical user interface corresponding to the second virtual object, a position where the first virtual object is located, indicated by the clue information, in a second display format; and/or, displaying, in the game scene in the graphical user interface corresponding to the second virtual object, an object model of the first virtual object indicated by the clue information in a third display format, with the displaying lasting for a second time period.

12. The method according to claim 11, further comprising:

determining, within the second time period after the second clue information is acquired, that the second virtual object acquires third clue information corresponding to the first virtual object again, and prolonging the second time period.

13. The method according to claim 1, further comprising:

displaying, in response to the first virtual object moving in the game scene, a movement track of the first virtual object in the game scene based on a preset display density.

14. The method according to claim 13, wherein the displaying in response to the first virtual object moving in the game scene a movement track of the first virtual object in the game scene based on a preset display density comprises:

acquiring, in response to the first virtual object moving in the game scene, a moving path of the first virtual object; and displaying at least one virtual footprint left by the virtual object in a moving process every preset length of the path on the moving path.

15. The method according to claim 1, wherein the displaying in response to one of the at least one second virtual object acquiring the clue information corresponding to the first virtual object from the target object identifier information corresponding to the first virtual object in a graphical user interface corresponding to the second virtual object based on the clue information comprises:

updating a clue accumulated value corresponding to the first virtual object according to the clue information, wherein the clue information comprises a clue value; and determining corresponding display manner of the identifier information according to a threshold range reached by the clue accumulated value.

16. An electronic device, comprising a processor and a memory, wherein the memory stores machine-executable instructions executable by the processor, and the processor is configured to execute the machine-executable instructions so as to implement a method for in-game information interaction, wherein the method comprises:

generating clue information corresponding to a first virtual object, in response to determining that the first virtual object performs a first target interactive operation on a target object in a same game scene, and associating the clue information with the target object, wherein a game comprises the same game scene, the first virtual object having a first identity, at least one second virtual object having a second identity being opposite to the first identity, a non-player character, and a virtual article located in the same game scene, wherein the first virtual object and the at least one second virtual object are located in a same match, and the target object is at least one of the at least one second virtual object, the non-player character, and the virtual article; and displaying in response to one of the at least one second virtual object acquiring the clue information corresponding to the first virtual object from the target object, identifier information corresponding to the first virtual object in a graphical user interface corresponding to the one second virtual object, based on the clue information;

wherein the displaying in response to one of the at least one second virtual object acquiring the clue information corresponding to the first virtual object from the target object identifier information corresponding to the first virtual object in a graphical user interface corresponding to the second virtual object based on the clue information comprises:

acquiring the clue information associated with the target object, in response to determining that the second virtual object performs a second target interactive operation on the target object; and displaying, based on the clue information, the identifier information corresponding to the first virtual object in the graphical user interface corresponding to the second virtual object;

wherein the displaying based on the clue information the identifier information corresponding to the first virtual object in the graphical user interface corresponding to the second virtual object comprises:

determining a current display format of the identifier information corresponding to the first virtual object; and determining, according to the current display format, a target display format of displaying the identifier information corresponding to the first virtual object in the graphical user interface corresponding to the second virtual object, and displaying an area where the first virtual object is located, indicated by the clue information, in the target display format.

17. A non-volatile machine-readable storage medium, wherein the non-volatile machine-readable storage medium stores machine-executable instructions, and when the machine-executable instructions are called and executed by a processor, the machine-executable instructions cause the processor to implement a method for in-game information interaction, wherein the method comprises:

generating clue information corresponding to a first virtual object, in response to determining that the first virtual object performs a first target interactive operation on a target object in a same game scene, and associating the clue information with the target object, wherein a game comprises the same game scene, the first virtual object having a first identity, at least one second virtual object having a second identity being opposite to the first identity, a non-player character, and a virtual article located in the same game scene, wherein the first virtual object and the at least one second virtual object are located in a same match, and the target object is at least one of the at least one second virtual object, the non-player character, and the virtual article; and displaying, by a terminal, in response to one of the at least one second virtual object acquiring the clue information corresponding to the first virtual object from the target object, identifier information corresponding to the first virtual object in a graphical user interface corresponding to the one second virtual object, based on the clue information;

wherein the displaying in response to one of the at least one second virtual object acquiring the clue information corresponding to the first virtual object from the target object identifier information corresponding to the first virtual object in a graphical user interface corresponding to the second virtual object based on the clue information comprises:

acquiring the clue information associated with the target object, in response to determining that the second virtual object performs a second target interactive operation on the target object; and displaying, based on the clue information, the identifier information corresponding to the first virtual object in the graphical user interface corresponding to the second virtual object;

wherein the displaying based on the clue information the identifier information corresponding to the first virtual object in the graphical user interface corresponding to the second virtual object comprises:

determining a current display format of the identifier information corresponding to the first virtual object; and determining, according to the current display format, a target display format of displaying the identifier information corresponding to the first virtual object in the graphical user interface corresponding to the second virtual object, and displaying an area where the first virtual object is located, indicated by the clue information, in the target display format.

18. The method according to claim 1, wherein the displaying based on the clue information the identifier information corresponding to the first virtual object in the graphical user interface corresponding to the second virtual object comprises:

in response to determining that a first threshold range reached by the clue accumulated value, displaying, in the scene map of the game scene in the graphical user interface corresponding to the second virtual object, an area where the first virtual object is located, indicated by the clue information, in the first display format, with the displaying lasting for a first time period; and determining, within the first time period, that a second threshold range is reached by the clue accumulated value, and displaying, in the scene map of the game scene in the graphical user interface corresponding to the second virtual object, a position where the first virtual object is located, indicated by the clue information, in a second display format; or displaying, in the game scene in the graphical user interface corresponding to the second virtual object, an object model of the first virtual object indicated by the clue information in a third display format, with the displaying lasting for a second time period.

* * * * *